United States Patent
Wu

(10) Patent No.: US 10,832,585 B2
(45) Date of Patent: Nov. 10, 2020

(54) READING PROGRESS INDICATOR

(71) Applicant: Hewlett-Packard Development Company, L.P., Houston, TX (US)

(72) Inventor: Shanchan Wu, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 239 days.

(21) Appl. No.: 15/514,397

(22) PCT Filed: Sep. 26, 2014

(86) PCT No.: PCT/US2014/057647
§ 371 (c)(1),
(2) Date: Mar. 24, 2017

(87) PCT Pub. No.: WO2016/048346
PCT Pub. Date: Mar. 31, 2016

(65) Prior Publication Data
US 2017/0301252 A1    Oct. 19, 2017

(51) Int. Cl.
| G09B 5/00 | (2006.01) |
| G09B 5/12 | (2006.01) |
| G06Q 30/02 | (2012.01) |
| G09B 5/02 | (2006.01) |
| G06T 11/20 | (2006.01) |

(52) U.S. Cl.
CPC ......... *G09B 5/125* (2013.01); *G06Q 30/0261* (2013.01); *G06Q 30/0272* (2013.01); *G09B 5/02* (2013.01); *G06T 11/206* (2013.01)

(58) Field of Classification Search
CPC ........ G09B 5/125; G09B 5/062; G06Q 50/20; G06F 15/0291
See application file for complete search history.

(56) References Cited

U.S. PATENT DOCUMENTS

| 8,554,640 B1 | 10/2013 | Dykstra et al. |
| 8,793,575 B1* | 7/2014 | Lattyak ............... G09B 5/062 715/273 |
| 2002/0042786 A1* | 4/2002 | Scarborough ........ G06Q 10/063 706/21 |
| 2003/0152894 A1 | 8/2003 | Townshend |
| 2006/0147890 A1 | 7/2006 | Bradford |
| 2008/0126285 A1 | 5/2008 | Dinger et al. |
| 2008/0160491 A1 | 7/2008 | Allen et al. |
| 2008/0254430 A1 | 10/2008 | Woolf et al. |

(Continued)

FOREIGN PATENT DOCUMENTS

JP    2007192958 A    8/2007

OTHER PUBLICATIONS

Pearson, "Comprehension: the Search for Keystone Elements in College and Career Readiness".

*Primary Examiner* — Peter R Egloff
(74) *Attorney, Agent, or Firm* — HP Inc. Patent Department

(57) ABSTRACT

In the examples provided herein, a computer-implemented method causes to be displayed a unit of content for accessing by a user. The method also causes to be displayed a reading progress indicator based upon a first amount of time multiple other users spent to reach a current location within a set of sections of the unit of content accessed by the user and a second amount of time the other users spent to finish the set of sections.

15 Claims, 7 Drawing Sheets

(56) References Cited

U.S. PATENT DOCUMENTS

| | | |
|---|---|---|
| 2011/0177480 A1 | 7/2011 | Menon et al. |
| 2012/0047455 A1 | 2/2012 | Yuan et al. |
| 2013/0130219 A1 | 5/2013 | Elzinga et al. |
| 2013/0151300 A1 | 6/2013 | Le Chevalier et al. |
| 2014/0006563 A1 | 1/2014 | Needham et al. |
| 2014/0127656 A1* | 5/2014 | Healy ............... G09B 5/00 434/236 |
| 2014/0164593 A1 | 6/2014 | Murray et al. |
| 2015/0066583 A1* | 3/2015 | Liu .................. G06Q 30/0201 705/7.29 |

* cited by examiner

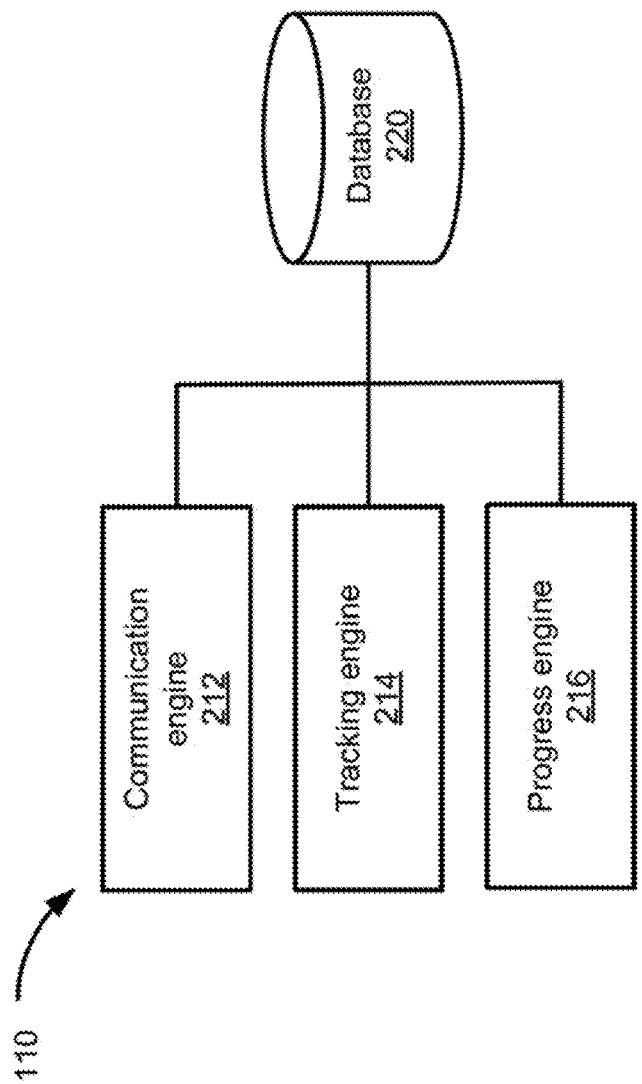

READING PROGRESS INDICATOR

BACKGROUND

An online education or e-learning system uses electronic technology to deliver electronic media for education. Online learning can be self-paced, where the student works through assignments, such as reading assignments, alone.

BRIEF DESCRIPTION OF THE DRAWINGS

The accompanying drawings illustrate various examples of the principles described below. The examples and drawings are illustrative rather than limiting.

FIG. 2A depicts a block diagram of an example digital material server.

DETAILED DESCRIPTION

With an online education system, it would be useful to provide feedback to a student about the student's learning progress, for example, the progress the student has made reading a textbook or other information provided online. If different parts of the book or assignment have different levels of difficulty, it may be difficult fore the student to judge how much progress has been made, besides counting the number of pages that have been read.

In some instances, the number of pages that have been read are not a good indicator of overall progress in an assignment. For example, if the assignment is to read 200 pages of a digital book, and the student finished the first 100 pages in one hour, the student may judge that he has finished half of the assignment because he has read half of the pages in the book. As a result, he may reserve another one hour for finishing the assignment. But if other users spent, on average, one hour reading the first 100 pages, and four hours reading the whole book, then it may be useful for the student to know that he has completed the effort for one quarter of the assignment and should be prepared to spend an additional three hours on the rest of the assignment, perhaps because harder material is presented in the second half of the assignment.

The techniques presented below analyze other users' learning experience with the same digital material and the current user's historical data on the finished portion of the digital material or assignment to provide to the user a reading progress indicator and/or information relating to a relative amount of effort a user should expect to exert when reading a section of the digital material.

Figure 1:
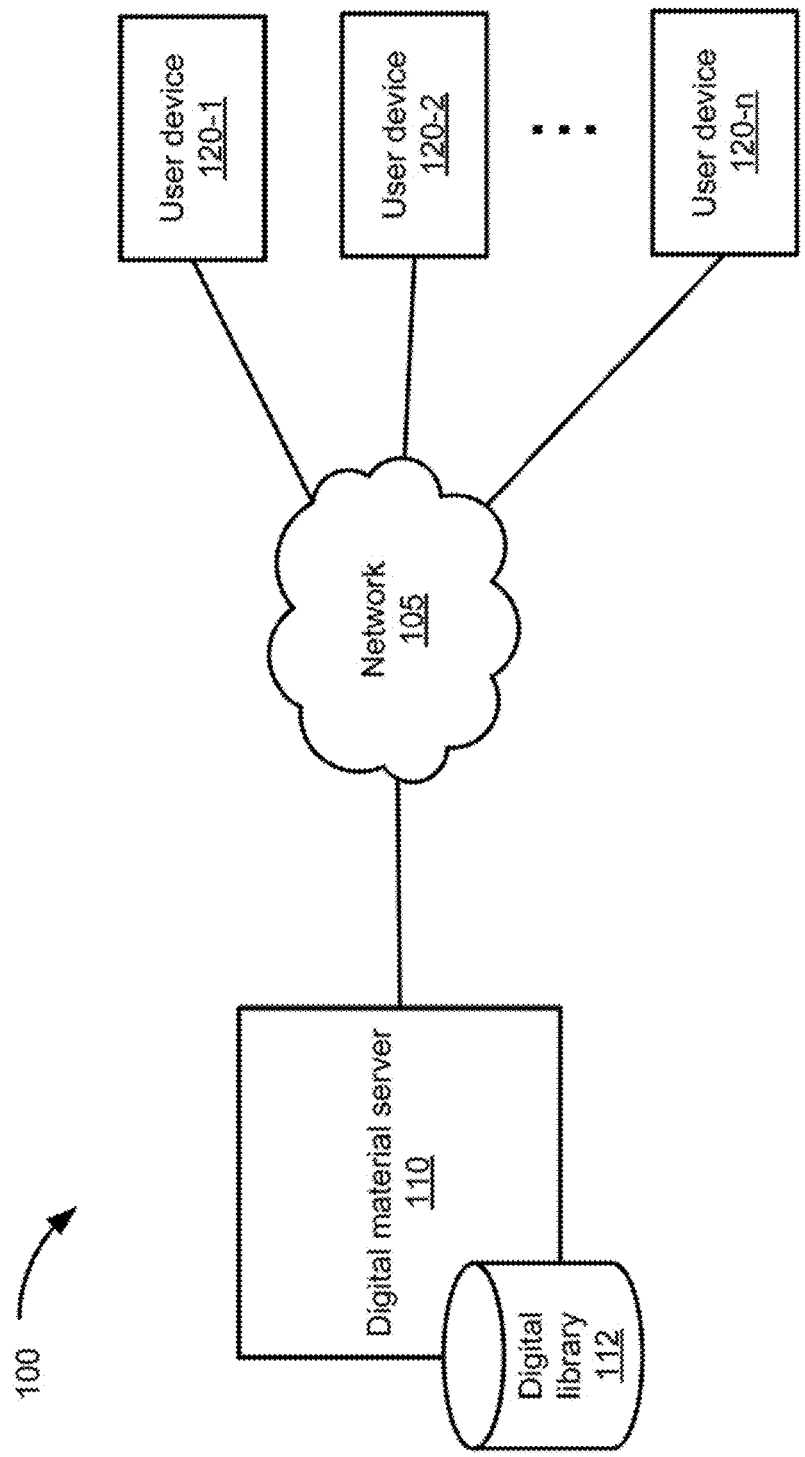
FIG. 1 depicts a block diagram of an example environment including a digital material server.

FIG. 1 depicts a block diagram of an example system 100 including a digital material server 110 and a digital library 112. The user devices 120 can be used by users to access digital material from the digital library 112 through the digital material server 110 via a network 105. The digital material stored in the digital library 112 can be any type of electronically provided printed material, such as a digital or electronic book (e-book), a digital magazine, a digital document or collection of documents, e.g., an e-magazine article or articles, and a collection of readings, e.g. assigned readings from digital texts for a class. The digital material can also be referred to herein as a unit of content, digital printed material, or an electronic publication. The digital library 112 can be external or internal to the digital material server 110. In some embodiments the digital library 112 can be made up of several separate databases.

The network 105 can be any type of network, such as the Internet, or an intranet. Alternatively, or additionally, one or more of the user devices 120 can be directly coupled to the digital material server 110.

FIG. 2A depicts a block diagram of an example digital material server 110. The digital material server 110 can include a communication engine 212, a tracking engine 214, and a progress engine 216. Each of the, engines 212, 214, 216 can interact with a database 220.

Communication engine 212 may be configured to receive a request for access to a digital material from the digital library 112 and provide access to the requested digital material.

The tracking engine 214 may be configured to calculate the time spent by a user accessing a sub-unit of a digital material. The sub-unit can be any partitioned portion of the digital material that can be tracked. For example, the digital material may be presented to the user on a page by page basis, and each page is the sub-unit. As another example, for a beginning reader, such as a reader learning a foreign language, the sub-unit can be a sentence or a paragraph of the digital material.

In the case where the digital material is presented one page at a time, the user is initially presented with the first page of the requested digital material. When the user is finished with the first page, the user can trigger presentation of the next page by using a predetermined signal, such as hitting the enter key or other predefined key, or clicking on a virtual button accessible on the user's device 120 when the digital material is presented. The time that the user spends accessing a particular page of the digital material can be tracked by timing and storing in the database 220 the time between presentation of the particular page to the user and the time when the next page is requested by the user. In addition to tracking the access time, the tracking engine 214 also stores a user identifier to distinguish users' access times in the database 220.

In some implementations, the tracking engine 214 can be configured to track active viewing time, for example, the active viewing time for a user for each page of a digital material. The user is considered to be actively viewing the digital material if user activity is sensed by the tracking engine 214, for example, if the user provides input by moving the mouse or pressing a button on a keyboard of the user device 120 at least once every predetermined period of time, such as two minutes. In some implementations, if the predetermined period of time elapses with no input detected from the user, the tracking engine 214 can stop tracking the access time for the current page and resume tracking when input is again detected. Alternatively, the tracking engine 214 can omit recording an access time for the current page.

In some implementations, the progress engine 216 may be configured to provide a reading progress indicator. In the following description, the case where the digital material is provided to the user one page at a time will be used. However, the disclosed techniques are applicable to other sub-units. Further, the example of a digital book will be used as the digital material in the following description. However, the digital material can be any type of electronically provided material, including, for example, select pages or sections from one or more digital books or other digital material.

As discussed above, the tracking engine 214 can determine the amount of time that a user spends accessing a particular page. For a digital book that has m pages, the average time $\bar{t}_k$ spent accessing page k by a user is given by:

$$\bar{t}_k = \frac{\sum_{i=1}^{n} t_{i,k}}{n},$$

where $t_{i,k}$ is the time spent by user i on page k, and the time spent accessing page k is averaged over n different users. Further, the average time spent accessing any page in the digital book is given by:

$$\bar{t} = \frac{\sum_{k=1}^{m} \bar{t}_k}{m},$$

that is, the average time spent accessing each page by different users is averaged over all the pages of the digital book.

Additionally, the average aggregate time spent accessing any group of pages, for example, consecutive pages or non-consecutive pages, from a first page to the $k^{th}$ page in the group is given by:

$$\bar{T}_k = \sum_{j=1}^{k} \bar{t}_j,$$

that is, the average time spent accessing each page is summed over the k pages.

Then when a user finishes reading the $k^{th}$ page of a group of assigned pages in the digital book, and the user wishes to see how much progress has been made, the progress engine 216 can calculate and cause to be displayed a reading progress indicator. In some implementations, when there is sufficient historical user data tracked by the tracking engine 214 for the digital book, or the digital material accessed by the user, the reading progress can be calculated as $\bar{T}_k/\bar{T}_m$, that is, the ratio of the average aggregate time spent by each user accessing the first k pages of the assigned pages to the average aggregate time spent by each user accessing all pages of the assigned pages.

If there is statistically insufficient historical user data, for example, data for fewer than ten other users, a simple progress indicator can be provided that is given by k/m. That is, the simple progress indicator is the ratio of pages that have been accessed and read (k) to the total number of pages to be read (m) in the assignment.

Thus, in some implementations, the progress engine can cause to be displayed a reading progress indicator if a number of other users who have accessed the digital material or electronic publication is greater than a threshold, otherwise cause to be displayed a percentage indicator. The electronic publication has a given number of pages to be read by the first user, where the pages can be consecutive or non-consecutive. The reading progress indicator is a first ratio of a first time to a second time, where the first time is based on time spent by the other users accessing pages from a first page to a current page of the given number of pages accessed by the first user, and the second time is based on time spent by the other users accessing pages from the first page to an end page of the given number of pages. Further, the percentage indicator is a second ratio of i) a number of pages accessed by the first user from the first page to the current page to ii) a total number of pages in the given number of pages.

Figure 3A:
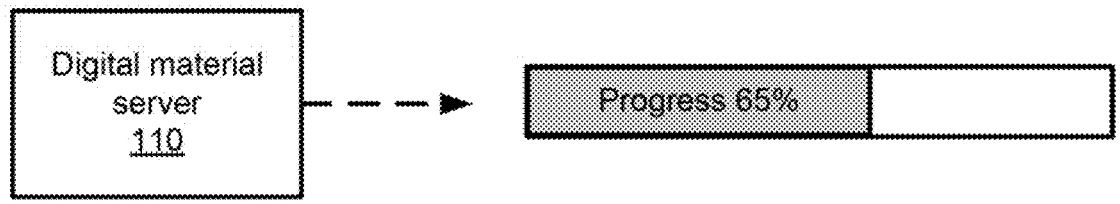
FIGS. 3A-3B depict examples of information provided as feedback to a user by the digital material server.

The reading progress indicator can be graphical, for example, a progress bar or a pie chart, and/or quantitative, far example, expressed in terms of percentage of progress completed. FIG. 3A shows an example progress indicator in the form of a graphical progress bar that the progress engine 216 can cause to be displayed. In the example of FIG. 3A, the user's progress is shown to be 65%.

While a mathematical average was used in the above equations, any mathematical function can be selected and applied to the time users spend accessing the first k pages and all the pages of the assignment. The mathematical function can even be non-linear.

In some implementations, the progress engine 216 may be configured to provide information relating to a relative amount of effort a user should expect to exert while reading a section of a digital material. For example, a user may want to know how much effort to spend on a particular page of a reading assignment so that the user knows how much to pay attention while reading the page. If very little effort is needed for a page, the user may just skim the page, while if a lot of effort is indicated for the page, the user may want to take extra time to re-read parts of the page because the material may be more difficult. In some implementations, the user can request the information pertaining to expected effort to be exerted while reading the page by selecting a virtual button provided by the digital material server 110 along with the page of digital material. Alternatively, the progress engine 216 can provide the information automatically for every requested page.

Figure 3B:
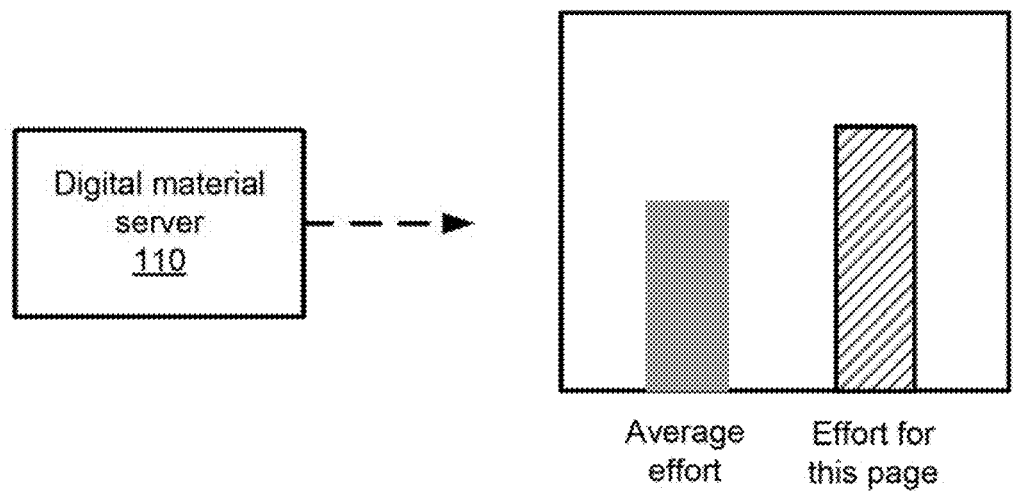

When the user requests the information pertaining to expected effort for a specific page, the progress engine 216 can cause to be displayed a comparison of the average effort needed to be exerted to read one page of the book, and the anticipated effort for reading the specific page. The average effort needed to be exerted to read one page of the book is proportional to the average time other users needed to read one page, $\bar{t}$, and the anticipated effort for reading the specific page k is proportional to the average time needed by other users to read that specific page, $\bar{t}_k$. FIG. 3B shows an example effort indicator, comparison that the progress engine 216 can cause to be displayed. The comparison shows the user the relative effort to be exerted for the specific page k as compared to an average page in the book, that is, how hard the material on the specific page is (right bar) compared to an average of the rest of the pages in the book, or a given set of pages of an assignment (left bar). While a bar chart format is shown in the, example of FIG. 3B, any other format can be used, such as a pie graph.

While a mathematical average was used in the comparison, any mathematical function can be selected and applied to the time users spent accessing a specific page and all the pages of an assignment. The mathematical function can even be non-linear.

Database 220 can store data, such as the time each user spends actively accessing each sub-unit, e.g., a page or section, of a digital material or unit of content.

Figure 2B:
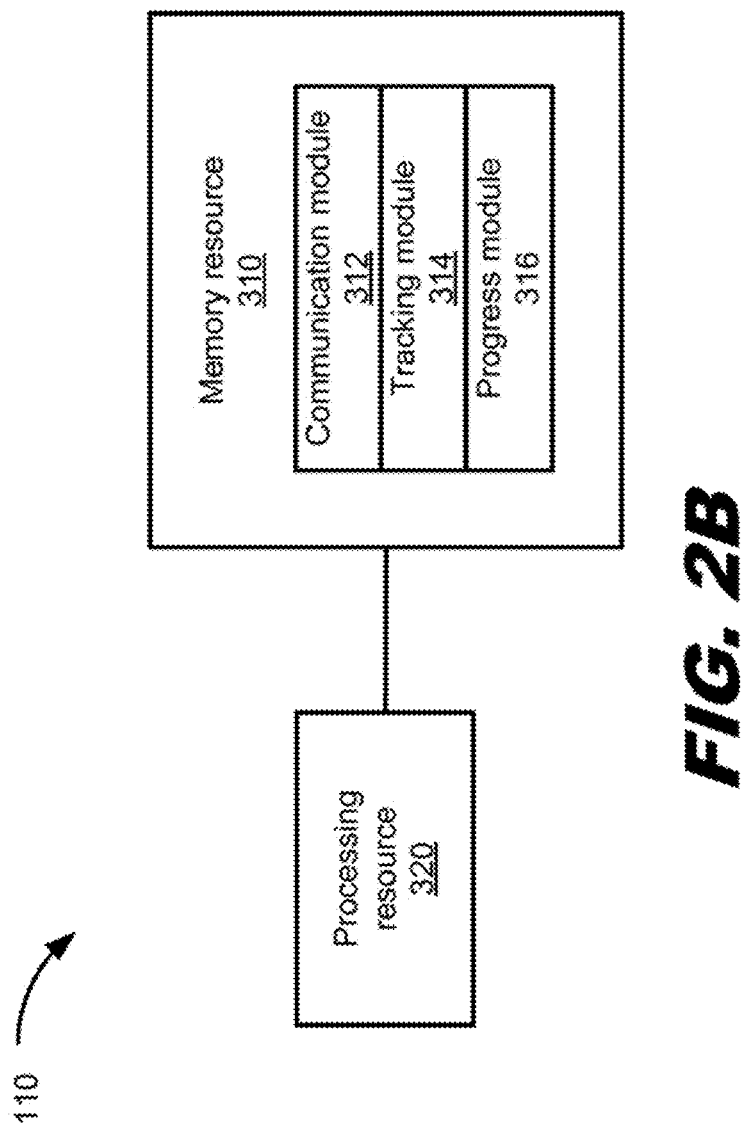
FIG. 2B depicts a block diagram of an example memory resource and an example processing resource to implement a digital meter server.

In the above description, various components were described as combinations of hardware and programming. Such components may be implemented in different ways. Referring to FIG. 2B, the programming may be processor executable instructions stored on tangible memory resource 310 and the hardware may include processing resource 320 for executing those instructions. Thus, memory resource 310 can store program instructions that when executed by processing resource 320, implements digital material server 110 of FIG. 2A.

Memory resource 310 generally represents any number of memory components capable of storing instructions that can be executed by processing resource 320. Memory resource 310 is non-transitory in the sense that it does not encompass a transitory signal but instead is made up of one or more memory components that store the relevant instructions. Memory resource 310 may be implemented in a single device or distributed across devices. Likewise, processing resource 320 represents any number of processors capable of executing instructions stored by memory resource 310. Processing resource 320 may be integrated in a single device or distributed across devices. Further, memory resource 310 may be fully or partially integrated in the same device as processing resource 320 or it may be separate but accessible to that device and processing resource 320.

In one example, the program instructions can be part of an installation package that when installed can be executed by processing resource 320 to implement digital material server 110. In this case, memory resource 310 may be a portable medium such as a compact disc (CD), digital video disc (DVD), or flash drive or a memory maintained by a server from which the installation package can be downloaded and installed. In another example, the program instructions may be part of an application or applications already installed. Memory resource 310 can include integrated memory, such as a hard drive, solid state drive, or the like.

In the example of FIG. 2B, the executable program instructions stored in memory resource 310 are depicted as communication module 312, tracking module 314, and progress module 316. Communication module 312 represents program instructions that when executed cause processing resource 320 to implement communication engine 212. Tracking module 314 represents program instructions that when executed cause processing resource 320 to implement tracking engine 214. Progress module 316 represents program instructions that when executed cause processing resource 320 to implement progress engine 216.

Figure 4:
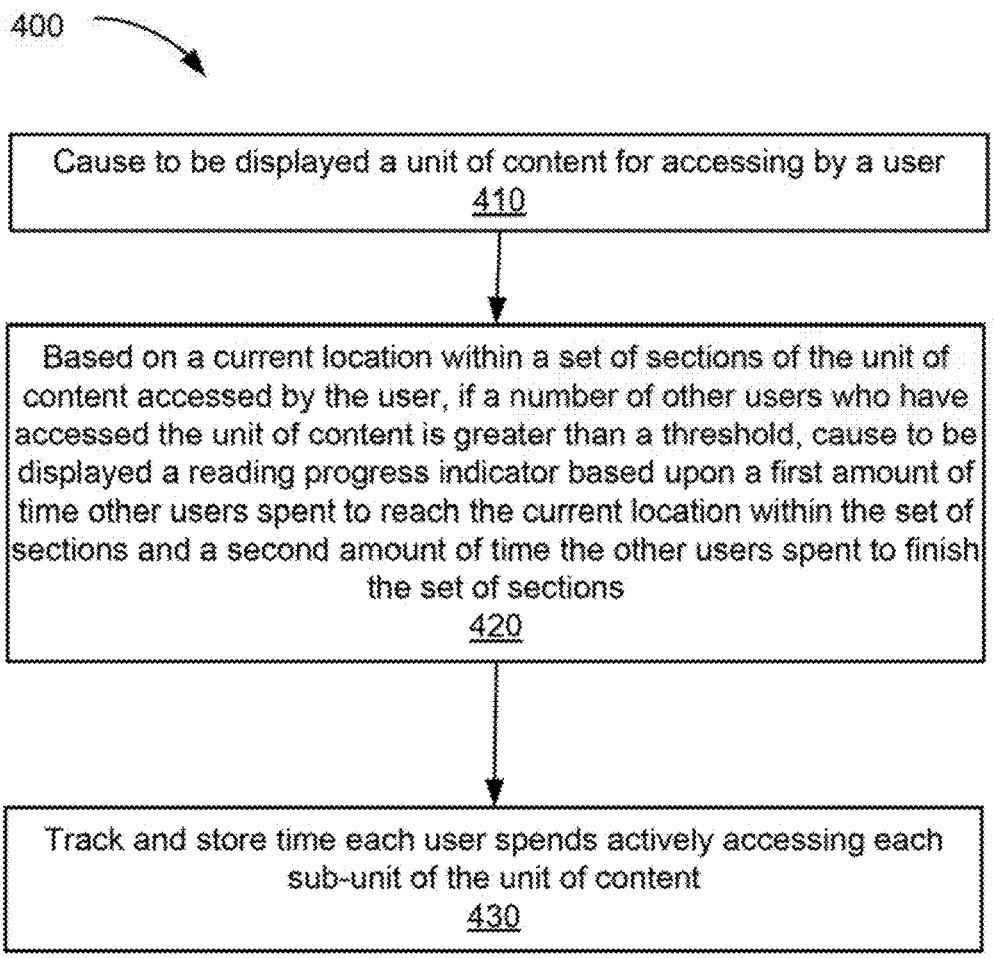
FIG. 4 depicts a flow diagram illustrating an example process of providing a reading progress indicator.

FIG. 4 depicts a flow diagram illustrating an example process 400 of providing a reading progress indicator.

At block 410, the digital material server a uses to be displayed a unit of content for accessing by a user.

Further, at block 420, if a number of other users who have accessed the unit of content is greater than a threshold, the digital material server causes to be displayed a reading progress indicator based upon a first amount of time each of the other users spent to reach a current location within a set of sections of the unit of content accessed by the user and a second amount of time the other users spent to finish the set of sections.

In some implementations the unit of content is a digital book, the current location is a current page, and the set of sections is the entire digital book. If the number of other users is not greater than the threshold, the digital material server causes to be displayed a percentage indicator, where the percentage indicator is a first ratio of a page number of the current page to a page number of a last page of the digital book. Further, in some implementations, the reading progress indicator is a second ratio of a first time to a second time, where the first time is based on time spent by the other users accessing pages from a first page to the current page of the digital book, and the second time is based on time spent by the other users accessing pages from a first page to the last page of the digital book. And the first time is an average aggregate time spent by each user accessing pages from the first page to the current page of the digital book, and further where the second time is the average aggregate time spent by each user accessing pages from the first page to the last page of the digital book.

Additionally, at block 430, the digital material server tracks and stores time each user spends actively accessing each sub-unit of the unit of content. For example, if the unit of content is accessed a page at a time by the user, a convenient sub-unit is a page of the unit of content.

Figure 5:
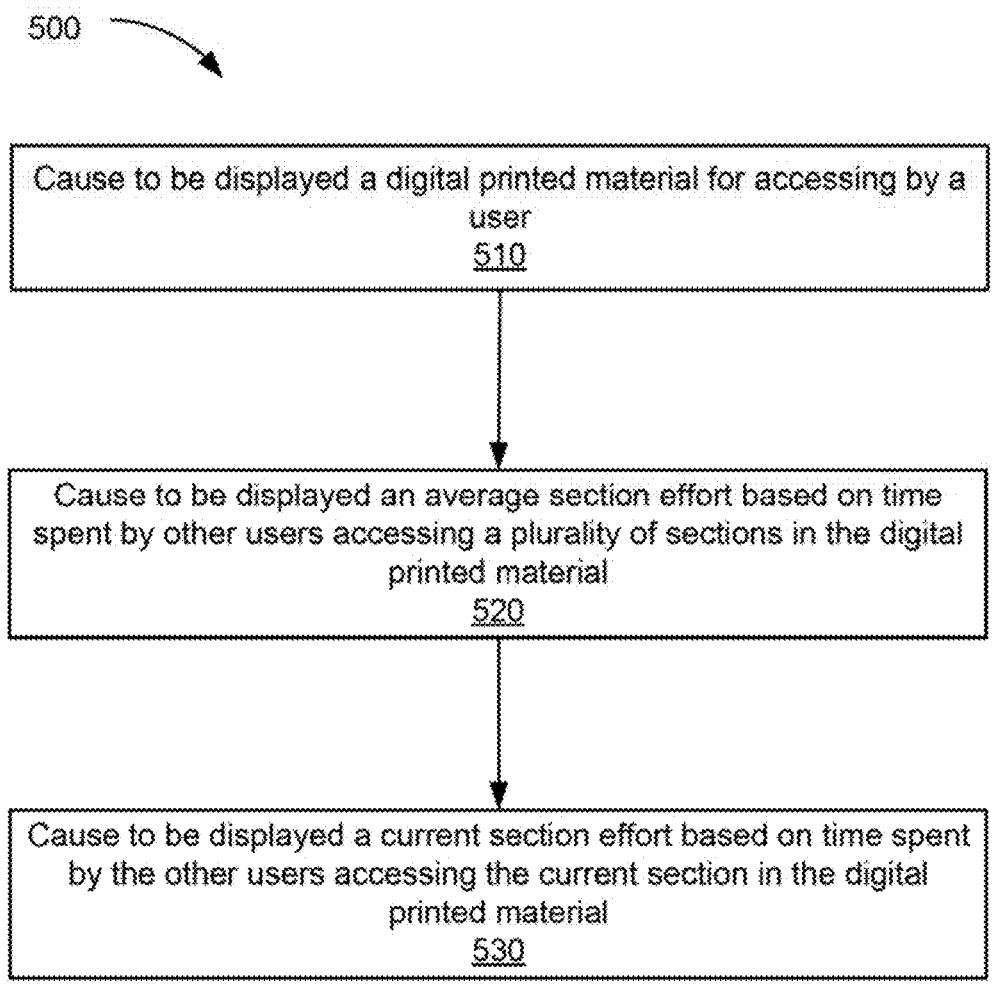
FIG. 5 depicts a flow diagram illustrating an example process of providing information relating to a relative amount of effort a user should expect to exert when reading a section of a digital printed material.

FIG. 5 depicts a flow diagram illustrating an example process 500 of providing information relating to a relative amount of effort a user should expect to exert when reading a section of a digital printed material.

At block 510, the digital material server causes to be displayed a digital printed material for accessing by a user.

And at block 520, based on a current section of the digital printed material accessed by the user, the digital material server causes to be displayed an average section effort based on time spent by other users accessing a plurality of sections in the digital printed material.

Further, at block 530, the digital material server causes to be displayed a current section effort based on time spent by the other users accessing the current section in the digital printed material. In some implementations, the plurality of sections in the digital printed material includes a predetermined set of pages of the digital printed material, and the current section is a current page accessed by the user. In some cases, the average section effort is proportional to an average of the time spent by each of the other users accessing each of the plurality of sections in the digital printed material, and further the current section effort is proportional to an average time spent on the current section by the other users. Further, the average section effort and the current section effort can be caused to be displayed graphically. Additionally, quantitative values for the average section effort and the current section effort can be caused to be displayed.

Figure 6:
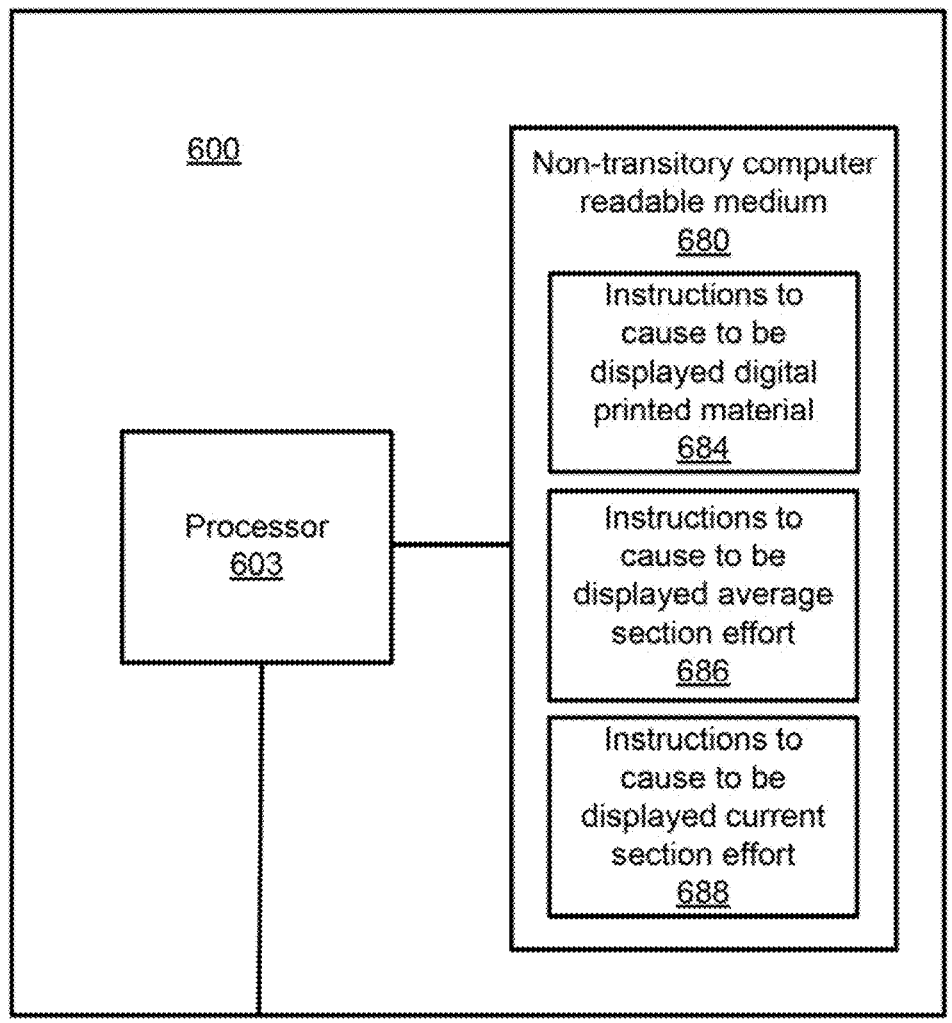
FIG. 6 depicts a block diagram of an example digital material server including a processor and a non-transitory computer readable medium.

FIG. 6 depicts a block diagram of an example system 600 including a processor 603 and a non-transitory computer readable medium 680 storing executable instructions according to the above disclosure. For example, the system 600 can be an implementation of the example digital material server 110 of FIG. 1.

The processor 603 can execute instructions stored on the non-transitory computer readable medium 680. For example, the non-transitory computer readable medium 680 can be any type of volatile or non-volatile memory or storage, such as random access memory (RAM), flash memory, read-only memory (ROM), storage volumes, a hard disk, or a combination thereof. When executed, the instructions can cause the processor 603 to perform a method of providing information relating to a relative amount of effort a user should expect to exert on a section of a digital printed material, such as the method described with respect to FIG. 5.

The example medium 680 can store instructions 684 executable by the processor 603 to receive and cause to be displayed digital printed material for accessing by a user. In some examples, the processor 603 can execute instruction 684 to perform block 510 of the method of FIG. 5.

The example medium 680 can further store instructions 686. The instructions 686 can be executable to cause to be displayed an average section effort based on time spent by other users accessing a plurality of sections in the digital printed material. In some examples, the processor 603 can execute instruction 686 to perform block 520 of the method of FIG. 5.

The example medium 680 can further store instructions 688. The instructions 688 can be executable to cause to be displayed a current section effort based on time spent by the other users accessing a current section in the digital printed material. In some examples, the processor 603 can execute instruction 688 to perform block 530 of the method of FIG. 5.

Not all of the steps, features, or instructions presented above are used in each implementation of the presented techniques.

What is claimed is:

1. A computer-implemented method comprising:
   determining over a network, by a processing resource, a number of other users who have accessed a unit of content and an amount of time spent by the other users to access the unit of content;
   causing to be displayed, by the processing resource, the unit of content for accessing by a user;
   based on a current location within a set of sections of the unit of content accessed by the user, in response to the number of the other users who have accessed the unit of content being greater than a threshold, causing to be displayed, by the processing resource, a reading progress indicator based upon the determined amount of time spent by the other users, the determined amount of time spent by the other users including a first amount of time the other users actively accessed the unit of content to reach the current location within the set of sections and a second amount of time the other users actively accessed the unit of content to finish the set of sections, wherein the first amount of time and the second amount of time are active viewing times based on user inputs within a predetermined amount of time, the user inputs being inputs for moving a mouse or pressing a button on a keyboard, wherein the user inputs are tracked for the predetermined amount of time, tracking is stopped when the predetermined amount of time elapses with no user input, and the tracking is resumed when a new user input is detected; and
   responsive to the user accessing a current page corresponding to the current location, causing to be displayed, by the processing resource, an effort indicator for the current page that shows a projection for an amount of effort required to read the current page based on an average amount of time in which the other users actively accessed the current page relative to an average amount of time in which the other users actively accessed other pages of the unit of content.

2. The computer-implemented method of claim 1, wherein the unit of content is a digital book, and the set of sections is an entire digital book, and further wherein in response to the number of other users not being greater than the threshold, causing to be displayed a percentage indicator, wherein the percentage indicator is a first ratio of a page number of the current page to a page number of a last page of the digital book.

3. The computer-implemented method of claim 2, wherein the reading progress indicator is a second ratio of a first time to a second time, wherein the first time is based on time spent by the other users accessing pages from a first page to the current page of the digital book, and the second time is based on time spent by the other users accessing pages from a first page to the last page of the digital book.

4. The computer-implemented method of claim 3, wherein the first time is an average aggregate time spent by each user accessing units from a first unit to a current unit of the digital book, and further wherein the second time is the average aggregate time spent by each user accessing units from the first unit to a last unit of the digital book.

5. The computer-implemented method of claim 2, further comprising tracking and storing the active viewing times for each user actively accessing each page of the digital book.

6. The computer-implemented method of claim 1, wherein the reading progress indicator is caused to be displayed graphically.

7. A system comprising:
   a processing resource; and
   a memory resource on which is stored instructions that, when executed by the processing resource, cause the processing resource to:
   determine over a network a number of other users who have accessed an electronic publication and an amount of time spent by the other users to access the electronic publication;
   provide access to the electronic publication to a first user, wherein the electronic publication has a given number of pages to be read by the first user;
   cause to be displayed a reading progress indicator in response to the number of other users who have accessed the electronic publication being greater than a threshold, otherwise cause to be displayed a percentage indicator,
   wherein the reading progress indicator is based on the determined amount of time spent by the other users, the determined amount of time spent by the other users including a first time and a second time and the reading progress indicator being a first ratio of the first time to the second time, wherein the first time is based on time spent by the other users actively accessing pages from a first page to a current page of the given number of pages accessed by the first user, and the second time is based on time spent by the other users actively accessing pages from the first page to an end page of the given number of pages, wherein the first time and the second time are active viewing times based on user inputs within a predetermined amount of time, the user inputs being inputs for moving a mouse or pressing a button on a keyboard, wherein the processing resource is caused to track the user inputs for the predetermined amount of time, stop tracking the user inputs when the predetermined amount of time elapses with no user input, and resume tracking the user inputs when a new user input is detected, and
   wherein the percentage indicator is a second ratio of i) a number of pages accessed by the first user from the first page to the current page to ii) a total number of pages in the given number of pages; and responsive to the first user accessing the current page, cause to be displayed an effort indicator for the current page that shows a projection for an amount of effort required to read the current page based an average amount of time in which the other users actively accessed the current page relative to an average amount of time in which the other users actively accessed other pages of the electronic publication.

8. The system of claim 7, wherein the instructions are further to cause the processing resource to track the active viewing times for the other users for each page of the electronic publication.

9. The system of claim 7, wherein the first time is an average aggregate time spent by each of the other users accessing pages from the first page to the current page of the given number of pages, and further wherein the second time is the average aggregate time spent by each of the other users accessing pages from the first page to the end page of the given number of pages.

10. The system of claim 7, wherein the reading progress indicator is caused to be displayed graphically.

11. A non-transitory computer readable medium having stored thereon a computer executable program, the computer executable program when executed causes a computer system to:
- determine over a network an amount of time spent by the other users to access a digital printed material;
- cause to be displayed the digital printed material for accessing by a user; and
- based on a current section of the digital printed material accessed by the user and the determined amount of time spent by the other users actively accessing the digital printed material, cause to be displayed:
- an average section effort based on the determined amount of time spent by the other users actively accessing a plurality of sections in the digital printed material, and
- a current section effort based on the determined amount of time spent by the other users actively accessing the current section in the digital printed material; and
- responsive to the user accessing a current page in the current section, cause to be displayed an effort indicator for the current page that shows a projection for an amount of effort required to read the current page based on an average amount of time in which the other users actively accessed the current page relative to an average amount of time in which the other users actively accessed other pages of the digital printed material, wherein the effort indicator is based on active viewing times that are based on user inputs within a predetermined amount of time, the user inputs being inputs for moving a mouse or pressing a button on a keyboard, wherein the computer system is caused to track the user inputs for the predetermined amount of time, stop tracking the user inputs when the predetermined amount of time elapses with no user input, and resume tracking the user inputs when a new user input is detected.

12. The computer readable medium of claim 11, wherein the plurality of sections in the digital printed material includes a predetermined set of pages of the digital printed material.

13. The computer readable medium of claim 11, wherein the average section effort is proportional to an average of tracked time spent by each of the other users accessing each of the plurality of sections in the digital printed material, and further wherein the current section effort is proportional to an average time spent on the current section by the other users.

14. The computer readable medium of claim 11, wherein the average section effort and the current section effort are caused to be displayed graphically.

15. The computer readable medium of claim 11, wherein quantitative values for the average section effort and the current section effort are caused to be displayed.

\* \* \* \* \*